United States Patent [19]
Patton

[11] 3,873,808
[45] Mar. 25, 1975

[54] COMBINATION TEMPERATURE AND PRESSURE RELIEF VALVE WITH ENERGY CUTOFF SWITCH

[75] Inventor: Thayer E. Patton, Chattanooga, Tenn.

[73] Assignee: Ronald E. Williams, Chattanooga, Tenn.

[22] Filed: June 13, 1974

[21] Appl. No.: 478,901

[52] U.S. Cl. ............... 219/332, 219/328, 219/331, 219/491, 219/494, 219/496, 219/512
[51] Int. Cl. ....................... H05b 1/02, F24h 1/00
[58] Field of Search .......... 219/328, 331, 332, 491, 219/494, 496, 512, 513; 126/388, 374; 122/504; 200/82; 340/227 R, 229, 220, 240; 236/43, 42, 92 R

[56] References Cited
UNITED STATES PATENTS

| | | | |
|---|---|---|---|
| 1,694,492 | 12/1928 | Tabler | 122/504 X |
| 1,958,660 | 5/1934 | Frazer | 219/332 |
| 2,044,611 | 6/1936 | Hodges | 219/331 |
| 3,154,248 | 10/1964 | Fulton et al. | 122/504 X |
| 3,716,188 | 2/1973 | Shulz | 219/332 X |

Primary Examiner—C. L. Albritton
Attorney, Agent, or Firm—Lamont Johnston

[57] ABSTRACT

A device for limiting the temperature and pressure of a fluid by controlling the electric current to a heating element. The device is mounted within a tank in which the fluid is heated and includes a pressure responsive piston movable within a cylinder against a compression spring opposing movement of the piston. When the pressure exceeds that for which the spring is designed, the piston compresses the spring and operates an actuator for a microswitch to break the electric circuit to the heating element. A temperature responsive element having an expansible core within the tank is connected to the piston and causes it to compress the spring and operates the actuator of the microswitch to break the electric circuit.

2 Claims, 1 Drawing Figure

PATENTED MAR 25 1975 3,873,808
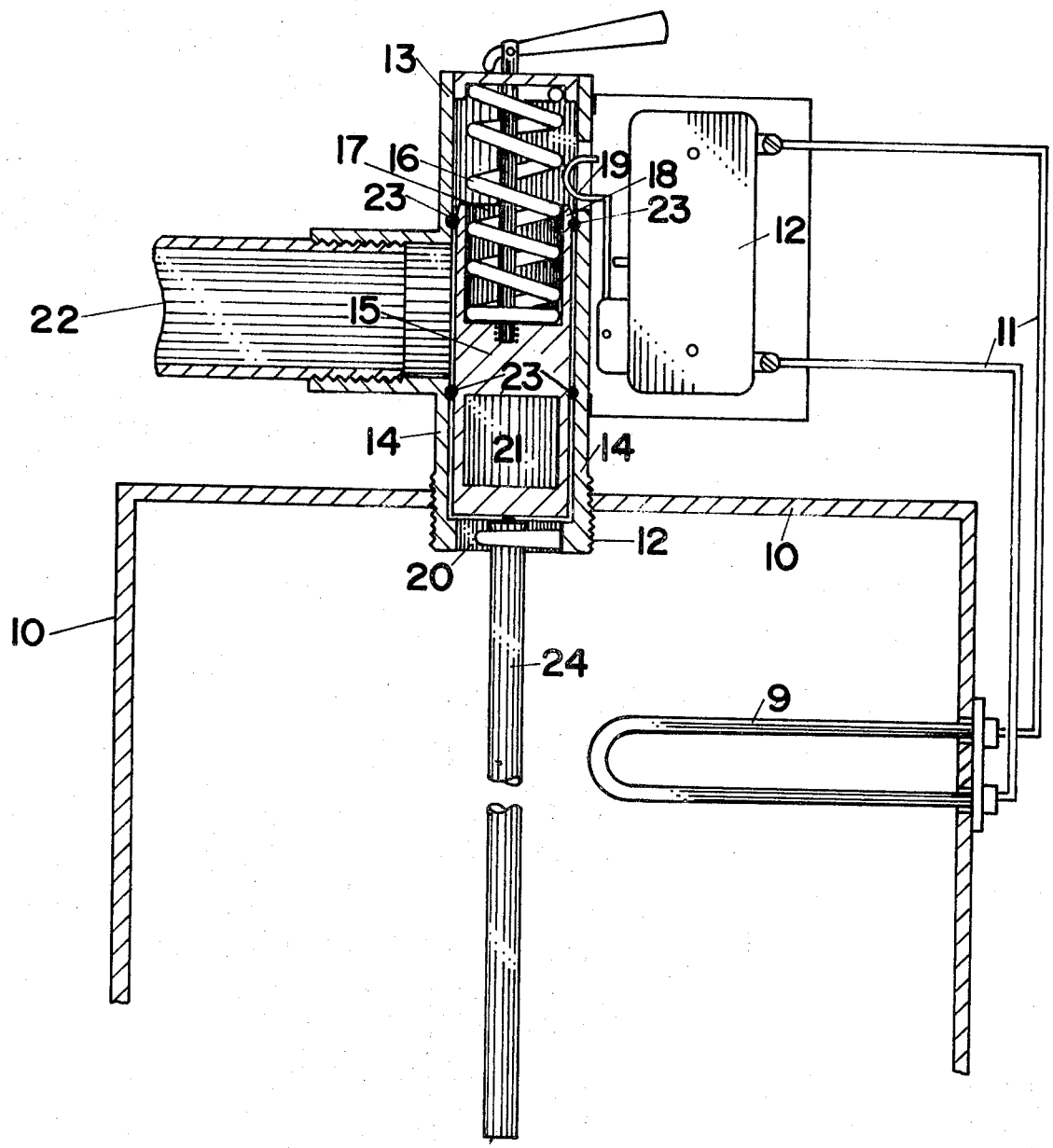

COMBINATION TEMPERATURE AND PRESSURE RELIEF VALVE WITH ENERGY CUTOFF SWITCH

BACKGROUND OF THE INVENTION

The fact that all electric water heaters manufactured have quick recovery heating elements installed in them has caused serious problems to the industry.

Safty codes require that at the time of installation a temperature and pressure relief valve be installed on each water heater with a maximum opening pressure of 150 PSI. Since the element heats the water at a very rapid pace, the water will expand rapidly and cause the pressure in the heater to exceed the opening pressure of the relief valve, thus causing the relief valve to discharge hot water. This can be very wasteful and also very dangerous.

SUMMARY OF THE INVENTION

By use of a control made in accordance with the present invention installed in the heater, this cannot happen. When the temperature in the heater causes the pressure to exceed the pressure setting, it will automatically cut off all electricity to the heating elements. The control will turn the electricity back on again when the pressure is relieved.

When the pressure in the heater exceeds the setting of the pressure control, it will also automatically cut off all electricity to the heating elements, but will turn the electricity back on automatically when the pressure in the water heater falls below the control setting

BRIEF DESCRIPTION OF THE DRAWING

The single FIGURE is a cross sectional view of one embodiment of a pressure and temperature limiting device made in accordance with this invention with a microswitch to control the electricity to heating elements.

DESCRIPTION OF THE PREFERRED EMBODIMENT

An element 9 for heating a fluid within a tank 10 is connected by an electric circuit 11 to a microswitch 12, mounted upon a support assembly 13. The support assembly is attached to the tank by being inserted through a wall of the tank. The assembly includes a cylinder 14 and a pressure responsive piston 15 movable within the cylinder. Movement of the piston is opposed by a stainless steel compression spring 16 which extends into an opening 17 in an open end 18 of the piston.

When the pressure on the piston is sufficiently great to overcome the resistance of the spring, the piston is moved within the cylinder and its end 18 moves against a spring actuator 19 for the microswitch. As the piston continues to move against the actuator, the circuit in the microswitch is broken and the electric current flowing through the leads 11 to the heating element is cut off. At the same time, the pressure of the fluid within the tank is relieved by the escape of fluid through openings 20 and 21 in the piston into a discharge pipe 22. The pressure within the tank is relieved sufficiently that the spring returns the piston to its normal position. The further escape of fluid is prevented by the closing of the connection between the opening 21 and the discharge pipe 22. At this time, the spring actuator 19 returns to its normal position and the microswitch is returned to its normal position to allow flow again of electricity to the heating element.

Sealing of the fluid and movement of the piston within the cylinder is lubricated by a pair of O-rings 23, preferably made of "TEFLON" or of some other durable plastic material.

When the temperature of the fluid within the tank exceeds a certain limit, a temperature bulb 24 acts to push against the piston 15 to compress spring 16, thus causing actuator 19 to cut off electricity through the leads 11 to the heating element. In this case, the resetting of the microswitch is accomplished automatically, when the temperature returns to normal.

There are many advantages of this invention, some of these are that a simple and inexpensive device is provided to afford safety in use of a fluid pressure heating device. When the pressure of the fluid within the tank heated by the device exceeds a certain limit, the pressure is automatically relieved and the electricity to a heating element within the tank is cut off. At the same time, after the pressure has been relieved, the electricity to the heating element is restored. Also, when the temperature within the tank containing the fluid being heated exceeds a certain maximum, the electricity to the heating element is cut off. In this case, when the temperature of fluid drops back to normal, the electricity to the element is restored automatically.

A device made in accordance with this invention complies with safety codes in effect and guards the user against danger and loss of valuable property.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A device for limiting the temperature and pressure of a fluid by controlling the electric current to an element (9) for heating the fluid which comprises a tank (10), a support assembly (13) for the device adapted to be inserted through a wall of the tank, the assembly including a cylinder (14) a pressure responsive piston (15) movable within the cylinder, a compression spring (16) opposing movement of the piston, an actuator (19) extending within the cylinder through the support assembly and adapted to be operated by movement of the piston, a microswitch (17) operable by the actuator to break an electric circuit (11) to the heating element, and a temperature responsive element (24) mounted within the tank, the element being connected to the piston to push the piston against the actuator of the microswitch to break the electric circuit to the heating element and a discharge conduit (20) for the overflow of fluid from the cylinder.

2. The device according to claim 1 in which the movement of the piston within the cylinder is lubricated and sealed against fluid pressure by durable plastic O-rings (23).

* * * * *